(12) United States Patent
An et al.

(10) Patent No.: US 9,868,471 B2
(45) Date of Patent: Jan. 16, 2018

(54) REINFORCEMENT UNIT OF ENGINE ROOM

(71) Applicants: Hyundai Motor Company, Seoul (KR); Kia Motors Corporation, Seoul (KR)

(72) Inventors: Byeongdo An, Jeollabuk-Do (KR); Tae Wan Park, Seoul (KR); Kang Chul Lee, Seoul (KR); Yong Dok An, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 12 days.

(21) Appl. No.: 15/228,312

(22) Filed: Aug. 4, 2016

(65) Prior Publication Data

US 2017/0313360 A1 Nov. 2, 2017

(30) Foreign Application Priority Data

Apr. 28, 2016 (KR) ........................ 10-2016-0052294

(51) Int. Cl.
*B60J 7/00* (2006.01)
*B62D 25/08* (2006.01)

(52) U.S. Cl.
CPC .................. *B62D 25/082* (2013.01)

(58) Field of Classification Search
CPC ...... B62D 21/11; B62D 21/152; B62D 25/12; Y10T 29/49622; B65D 85/48; B60K 1/00; B60R 21/38; B60L 3/0007; B60L 11/14; Y02T 10/7005

USPC .................. 296/193.09, 187.09, 203.02, 204
See application file for complete search history.

(56) References Cited

U.S. PATENT DOCUMENTS

| 2,189,719 A | * | 2/1940 | Wallace | ................ | B62D 21/02 |
| | | | | | 280/781 |
| 2,311,880 A | * | 2/1943 | Sherman | ................ | B62D 21/02 |
| | | | | | 280/783 |
| 2,384,096 A | * | 9/1945 | Kishline | .............. | B60G 99/004 |
| | | | | | 280/795 |

(Continued)

FOREIGN PATENT DOCUMENTS

| JP | 2006-044426 A | 2/2006 |
| KR | 10-1999-0019853 A | 3/1999 |
| KR | 10-2015-0063854 A | 6/2015 |

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A reinforcement unit of an engine room includes a first mounting bracket mounted to a front end module disposed at a front of a vehicle body; a second mounting bracket corresponding to the first mounting bracket and mounted to a cowl disposed at a rear of the vehicle body; a first connection bracket mounted to one shock absorber housing of the vehicle body; a second connection bracket mounted to another shock absorber housing of the vehicle body; a first connecting member having both ends mounted to one side of the first connection bracket and the second connection bracket; and a second connecting member disposed at the rear of the vehicle body while corresponding to the first connecting member and having both ends mounted to another side of the first connection bracket and the second connection bracket.

14 Claims, 6 Drawing Sheets

(56) References Cited

U.S. PATENT DOCUMENTS

| | | | | |
|---|---|---|---|---|
| 2,883,232 | A * | 4/1959 | Olley | B60G 99/004 280/792 |
| 3,108,836 | A * | 10/1963 | Deckert | B62D 25/20 280/793 |
| 3,171,669 | A * | 3/1965 | Barenyi | B60R 19/26 280/784 |
| 4,106,807 | A * | 8/1978 | Sakurai | B60G 3/225 180/312 |
| 4,240,517 | A * | 12/1980 | Harlow, Jr. | B60G 21/0551 180/295 |
| 6,390,437 | B1 * | 5/2002 | Hong | B62D 21/09 180/312 |
| 6,428,046 | B1 * | 8/2002 | Kocer | B62D 21/11 180/311 |
| 6,595,312 | B2 * | 7/2003 | Yoshioka | B60K 13/04 180/296 |
| 6,631,914 | B2 * | 10/2003 | Kawamura | B60G 3/24 180/381 |
| 6,880,663 | B2 * | 4/2005 | Fujiki | B62D 21/155 180/232 |
| 7,614,684 | B2 * | 11/2009 | Yasuhara | B60K 15/063 180/69.4 |
| 7,905,541 | B2 * | 3/2011 | Yamaguchi | B62D 25/2027 296/203.04 |
| 8,002,064 | B2 * | 8/2011 | Yamada | B62D 21/02 180/311 |
| 8,141,904 | B2 * | 3/2012 | Akaki | B62D 21/02 180/312 |
| 8,365,858 | B2 * | 2/2013 | Tamagawa | B60R 16/0207 180/291 |
| 8,876,132 | B2 * | 11/2014 | Marchena | B62D 21/11 180/311 |
| 8,882,184 | B2 * | 11/2014 | Naito | B62D 25/085 296/203.02 |
| 9,174,677 | B2 * | 11/2015 | Takahashi | B62D 21/11 |
| 9,333,825 | B2 * | 5/2016 | Stockard | B23P 11/00 |
| 9,555,835 | B2 * | 1/2017 | Lohmann | B62D 25/025 |
| 9,656,527 | B2 * | 5/2017 | Morishige | B60G 7/001 |
| 2007/0132223 | A1 * | 6/2007 | Scheffzuek | B62D 21/11 280/784 |
| 2007/0252412 | A1 * | 11/2007 | Yatsuda | B62D 25/082 296/193.09 |
| 2009/0096253 | A1 * | 4/2009 | Yatsuda | B62D 21/11 296/193.09 |
| 2013/0249250 | A1 * | 9/2013 | Ohhama | B62D 21/11 296/204 |
| 2013/0334840 | A1 * | 12/2013 | Iseki | B62D 21/11 296/193.09 |
| 2014/0152051 | A1 * | 6/2014 | Saitou | B62D 21/15 296/187.09 |

* cited by examiner

REINFORCEMENT UNIT OF ENGINE ROOM

CROSS-REFERENCE TO RELATED APPLICATION

This application claims under 35 U.S.C. §119(a) the benefit of Korean Patent Application No. 10-2016-0052294 filed in the Korean Intellectual Property Office on Apr. 28, 2016, the entire contents of which are incorporated herein by reference.

BACKGROUND (a) Field of the Invention

The present invention relates to a reinforcement unit of an engine room, more particularly, to a reinforcement unit for efficiently supporting a lateral direction load generated during driving to ensure stiffness of the engine room.

(b) Description of the Related Art

A front vehicle body is disposed at a front end of a vehicle based on a longitudinal direction of the vehicle, and is formed in a frame structure capable of forming an engine room. The front vehicle body includes a front end module which forms a front end of the engine room and in which a cooling module, a head lamp, etc., are installed, a front fender apron member which forms both left and right sides of the engine room and provides a space wherein a suspension system is disposed and where wheels are installed, and a firewall which is disposed behind the engine room and partitions a passenger compartment from the engine room.

Also, a front end member extending in the longitudinal direction of the vehicle is disposed under the engine room in left and right directions in a widthwise direction of the vehicle, thereby reinforcing the structural strength of the front vehicle body. A sub-frame configured to support an engine and a transmission installed in the engine room via a suspension system is disposed at a bottom of the front end member in a height direction of the vehicle, and is connected to the front end member.

However, in the above-described conventional engine room, while a lower portion is connected with the vehicle body, since an upper portion is not directly connected with the vehicle body, the upper portion of the engine room may be deficient in overall stiffness.

Also, in the upper portion of the engine room, it is difficult to efficiently disperse and support a lateral direction load generated during driving of the vehicle due to a connection deterioration between the vehicle body and the engine room. Accordingly, a lateral bending twist may be generated in the upper portion of the engine room.

The above information disclosed in this Background section is only for enhancement of understanding of the background of the invention and therefore it may contain information that does not form the prior art that is already known in this country to a person of ordinary skill in the art.

SUMMARY

The present invention provides a reinforcement unit of an engine room configured to efficiently disperse and support a lateral direction load generated during driving by integrally connecting a front and a rear of the engine room, as well as right and left sides of the upper portion of the engine room.

A reinforcement unit of an engine room according to an exemplary embodiment of the present invention includes a first mounting bracket mounted to a front end module disposed at a front of a vehicle body; a second mounting bracket corresponding to the first mounting bracket and mounted to a cowl disposed a rear of the vehicle body; a first connection bracket mounted to one shock absorber housing disposed in a width direction of the vehicle body; a second connection bracket mounted to another shock absorber housing disposed in the width direction of the vehicle body; a first connecting member having a center mounted to the first mounting bracket and both ends mounted to one side of the first connection bracket and the second connection bracket; and a second connecting member disposed at the rear of the vehicle body while corresponding to the first connecting member and having a center mounted to the second mounting bracket and both ends mounted to another side of the first connection bracket and the second connection bracket.

The first connecting member may be formed of a "V" character shape.

The center of the first connecting member may be inserted to the first mounting bracket through a predetermined portion and may be combined with the first mounting bracket through an adhesive and a riveting.

Both ends of the first connecting member may be respectively bolted to the first connection bracket and the second connection bracket.

The second connecting member may include a center portion disposed to be horizontal to the cowl and mounted to the second mounting bracket; a first bending portion formed from one end of the center portion toward the first connection bracket; and a second bending portion formed from another end of the center portion toward the second connection bracket.

The center portion may be inserted to the second mounting bracket, an upper exterior circumference may be adhered to an upper inside of the second mounting bracket through an adhesive, and a lower exterior circumference may be not applied with the adhesive.

The center portion may be fixed to the second mounting bracket through at least one pipe nut penetrating the second mounting bracket to be inserted inside the second mounting bracket.

The first bending portion and the second bending portion may be formed to be inclined from the rear of the vehicle body toward the front of the vehicle body.

In the first connection bracket, a first socket inserted with another end of the first bending portion having one end that is integrally connected to the center portion may be formed.

Another end of the first bending portion in a state that it is inserted to the first socket may be fixed to the first socket through the adhesive and the rivet.

In the second connection bracket, a second socket is formed to be inserted with another end of the second bending portion having one end integrally connected to the center portion may be formed.

The another end of the second bending portion in a state that it is inserted to the second socket may be fixed to the second socket through the adhesive and the riveting.

The first connecting member and the second connecting member connected through the first connection bracket and the second connection bracket may be formed of a rhombus shape.

The first connecting member and the second connecting member may be formed of a carbon fiber-reinforced plastic (CFRP).

In the reinforcement unit of the engine room according to an exemplary embodiment of the present invention, the front and rear sides and the left and right sides of the upper side of the engine room are integrally connected such that the lateral direction load generated during the driving is efficiency dispersed and supported, thereby improving the connectivity and the stiffness of the upper side of the engine room.

Also, during driving, as the rigidity of the upper side of the engine room for the lateral direction load is improved, the driving stability may be improved.

Further, as the lateral direction load input to the vehicle body is efficiency dispersed and transmitted to the vehicle body, the lateral bending twist may be effectively suppressed at the upper side of the engine room.

DETAILED DESCRIPTION OF THE EMBODIMENTS

Figure 1:
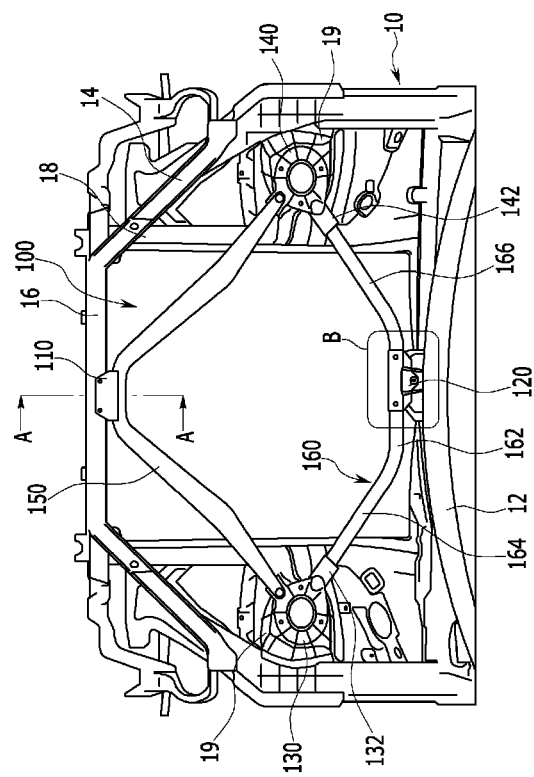
FIG. 1 is a top plan view of a vehicle body applied with a reinforcement unit for an engine room according to an exemplary embodiment of the present invention.

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Figure 2:
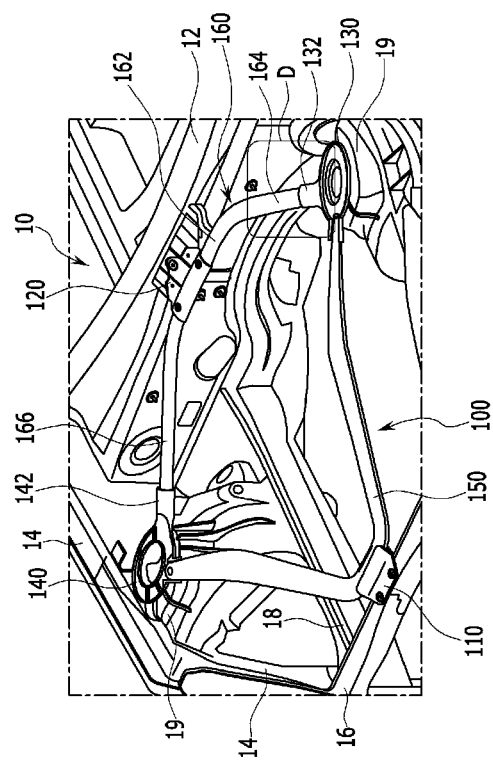
FIG. 2 is a front perspective view of a vehicle body applied with a reinforcement unit for an engine room according to an exemplary embodiment of the present invention.
Figure 3:
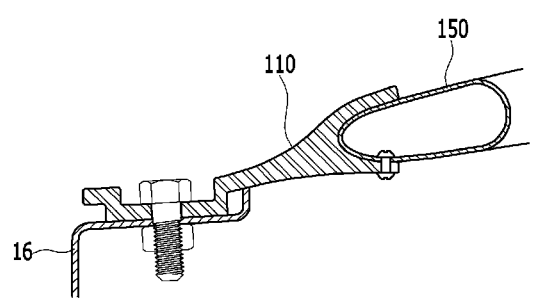
FIG. 3 is a cross-sectional view taken along a line A-A of FIG. 1.
Figure 4:
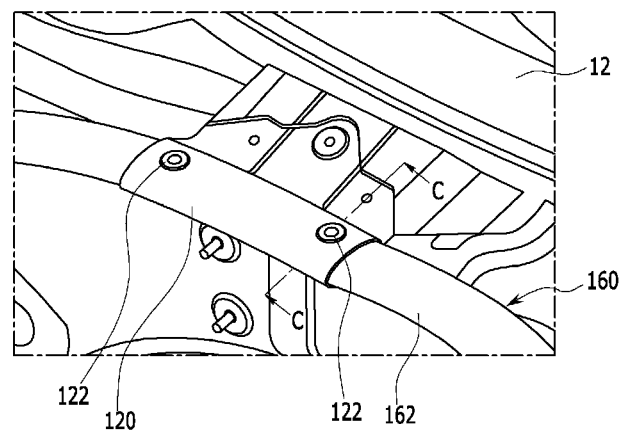
FIG. 4 is an enlarged perspective view of a part B of FIG. 1.
Figure 5:
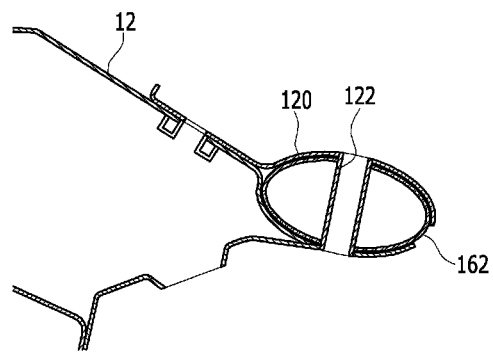
FIG. 5 is a cross-sectional view taken along a line C-C of FIG. 4.
Figure 6:
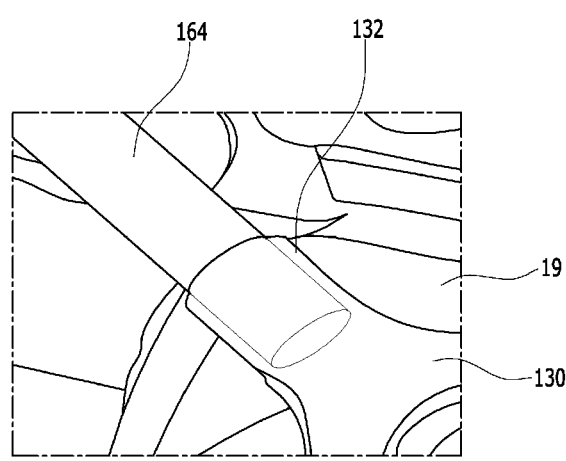
FIG. 6 is an enlarged perspective view of a part D of FIG. 2.

FIG. 1 is a top plan view of a vehicle body applied with a reinforcement unit for an engine room according to an exemplary embodiment of the present invention, FIG. 2 is a front perspective view of a vehicle body applied with a reinforcement unit for an engine room according to an exemplary embodiment of the present invention, FIG. 3 is a cross-sectional view taken along a line A-A of FIG. 1, FIG. 4 is an enlarged perspective view of a part B of FIG. 1, FIG. 5 is a cross-sectional view taken along a line C-C of FIG. 4, and FIG. 6 is an enlarged perspective view of a part D of FIG. 2.

Referring to FIGS. 1 and 2, a vehicle body 10 includes a cowl 12, a fender apron upper member 14, a front end module 16, a front side member 18, and a shock absorber housing 19.

The cowl 12 is a panel connected to a front of the front glass of the vehicle. Further, the cowl 12 may be extended from a dashboard or mounted to the dashboard.

The fender apron upper member 14 is an upper member of a fender apron. That is, the fender apron upper member 14 is provided to an upper side of the fender apron which serves as a partition of a wheel and the engine room on an inner side of the fender, which is a mudguard.

The front end module 16 is a member having different parts of a front of the vehicle body 10 constructed into one module. That is, the front end module 16 is arranged at a front side of the vehicle body 10.

The front side member 18 is a beam which forms a frame of the front of the vehicle body 10, and is provided under a front floor and the dashboard taking a longitudinal direction of the vehicle body 10 as a length direction thereof.

The shock absorber housing 19 is a portion to which shock absorbers are mounted arranged between the fender apron upper member 14 and the front side member 18.

Since various other members of the vehicle body 10 are apparent to those skilled in this field of art, detailed description of which will be omitted.

The reinforcement unit of the engine room 100 according to an exemplary embodiment of the present invention, as shown in FIGS. 1 and 2, is mounted on the engine room of the vehicle body 10 and includes a first mounting bracket 110, a second mounting bracket 120, a first connection bracket 130, a second connection bracket 140, a first connecting member 150, and a second connecting member 160.

The first mounting bracket 110 is mounted to the front end module 16 disposed at the front (i.e., on the basis of a forward/backward direction) of the vehicle body 10. The first mounting bracket 110 may be mounted to the front end module 16 through a bolt engagement.

The second mounting bracket 120 is mounted to the cowl 12 disposed at the rear of the vehicle body 10 while corresponding to the first mounting bracket 110. The second mounting bracket 120 may be mounted to the cowl 12 through the bolt engagement.

In the present exemplary embodiment, the first connection bracket 130 is mounted to one shock absorber housing 19 disposed in a width direction of the vehicle body 10.

Also, the second connection bracket 140 is mounted to another shock absorber housing 19 disposed in the width direction of the vehicle body 10.

The first and second connection brackets 130 and 140 may be mounted to the shock absorber housing 19 respectively disposed at both sides in the width direction of the vehicle body 10 through the bolt engagement.

In the present exemplary embodiment, the center of the first connecting member 150 is mounted to the first mounting bracket 110. One end of the first connecting member 150 is mounted to one side of the first connection bracket 130. Also, the other end (i.e., another end) of the first connecting member 150 is mounted to one side of the second connection bracket 140.

Here, the first connecting member 150 preferably is formed of a hollow bar shape. Also, both ends of the first connecting member 150 preferably are bent toward from the front toward the rear of the vehicle body 10 to be formed of a "V" character shape.

Meanwhile, in the present exemplary embodiment, the first connecting member 150 is formed of the hollow bar shape, however it is not limited thereto, and a reinforcement foam may be applied inside the first connecting member 150.

For the first connecting member 150, as shown in FIG. 3, the center thereof is partially inserted to the first mounting bracket 110 through a predetermined part. The first connecting member 150 may be stably combined with the first mounting bracket 110 through an adhesive and a riveting.

Both ends of the first connecting member 150 may be respectively bolted to the first connection bracket 130 and the second connection bracket 140.

Also, the second connecting member 160 is disposed at the rear of the vehicle body 10 while corresponding to the first connecting member 150. The center of the second connecting member 160 is mounted to the second mounting bracket 120. Further, one end of the second connecting member 160 is mounted to the other side (i.e., another side) of the first connection bracket 130. The other end (i.e., another end) of the second connecting member 160 is mounted to the other side (i.e., another side) of the second connection bracket 140.

Here, the second connecting member 160 may include the center portion 162, a first bending portion 164, and a second bending portion 166.

The portion 162 preferably is disposed to be horizontal to the cowl 12 and is mounted to the second mounting bracket 120. In particular, the center portion 162 is inserted to the second mounting bracket 120 that is configured to be divided into upper and lower panels as shown in FIGS. 4 and 5. The upper exterior circumference of the center portion 162 is adhered to the upper inside of the second mounting bracket 120 through the adhesive. Also, the lower exterior circumference of the center portion 162 may be not applied with the adhesive to be separated from the second mounting bracket 120.

Further, the center portion 162 may be fixed to the second mounting bracket 120 through at least one pipe nut 122 penetrating the second mounting bracket 120 to be inserted to inside the second mounting bracket 120.

In the present exemplary embodiment, two pipe nuts 122 are provided. The pipe nuts 122 may be mounted to the second mounting bracket 120 at separated positions in the width direction of the vehicle body 10.

That is, the center portion 162 may be stably combined with the second mounting bracket 120 through the adhesive and the pipe nut 122.

In the present exemplary embodiment, the first bending portion 164 is formed from one end of the center portion 162 toward the first connection bracket 130.

Also, the second bending portion 166 is formed from the other end (i.e., another end) of the center portion 162 toward the second connection bracket 140.

Here, the first bending portion 164 and the second bending portion 166 may be formed to be inclined from the rear of the vehicle body 10 toward the front of the vehicle body 10.

The above-configured first and second connecting members 150 and 160 may be formed of a carbon fiber-reinforced plastic (CFRP).

In the present exemplary embodiment, the first and second connecting members 150 and 160 preferably are formed of the CFRP material, however it is not limited thereto, and the first and second connecting members 150 and 160 may be formed of steel or aluminum.

On the other hand, in the first connection bracket 130, as shown in FIG. 6, a first socket 132 may be formed to be inserted with the other end (i.e., another end) of the first bending portion 164 having one end that is integrally connected to the center portion 162.

Accordingly, the other end of the first bending portion 164 may be fixed to the first socket 132 through the adhesive and the riveting in the state that it is inserted to the first socket 132.

Also, in the second connection bracket 140, a second socket 142 may be formed to be inserted with the other end (i.e., another end) of the second bending portion 164 having one end that is integrally connected to the center portion 162 (see, e.g., FIGS. 1 and 2).

Accordingly, the other end of the second bending portion 166 may be fixed to the second socket 142 through the adhesive and the riveting in the state that it is inserted to the second socket 142.

That is, the first connecting member 150 and the second connecting member 160 are integrally connected through the first connection bracket 130 and the second connection bracket 140, thereby being formed of a rhombus shape.

Accordingly, the first connecting member 150 and the second connecting member 160 connect the cowl 12, the front end module 16, and shock absorber housing 19 with the rhombus shape at the upper side of the engine room provided at the front of the vehicle body 10, thereby increasing the connectivity.

Also, an input point of the load input during the driving of the vehicle is integrate through the first and second mounting brackets 110 and 120 and the first and second connection brackets 130 and 140 and the load is dispersed to each constituent elements of the vehicle body 10 through the first and second connecting members 150 and 160, thereby being efficiency absorbed.

Accordingly, the twist rigidity for the lateral direction load at the upper side of the engine room is improved such that the deformation of the upper side of the engine room may be minimized.

In addition, as the first and second mounting brackets 110 and 120 and the first and second connection brackets 130 and 140 connect the first and second connecting members 150 and 160 with the inserting or enclosing structure, the cross-section shape of the first and second connecting members 150 and 160 may be maintained, and simultaneously, the load input to the first and second connecting members 150 and 160 may be effectively transmitted to each constituent elements of the vehicle body.

According, if the above-configured reinforcement unit of the engine room 100 according to an exemplary embodiment of the present invention is applied, the front and rear sides and the left and right sides of the upper side of the engine room are integrally connected such that the lateral direction load generated during driving is efficiency dispersed and supported, thereby improving the connectivity and the stiffness of the upper side of the engine room.

Also, during driving, as the rigidity of the upper side of the engine room for the lateral direction load is improved, the driving stability may be improved.

Further, as the lateral direction load input to the vehicle body is efficiency dispersed and transmitted to the vehicle body, lateral bending twist may be effectively suppressed at the upper side of the engine room.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A reinforcement unit of an engine room, comprising:
   a first mounting bracket mounted to a front end module disposed at a front of a vehicle body;
   a second mounting bracket corresponding to the first mounting bracket and mounted to a cowl disposed a rear of the vehicle body;
   a first connection bracket mounted to one shock absorber housing disposed in a width direction of the vehicle body;
   a second connection bracket mounted to another shock absorber housing disposed in the width direction of the vehicle body;
   a first connecting member having a center mounted to the first mounting bracket and both ends mounted to one side of the first connection bracket and the second connection bracket; and
   a second connecting member disposed at the rear of the vehicle body while corresponding to the first connecting member and having a center mounted to the second mounting bracket and both ends mounted to another side of the first connection bracket and the second connection bracket.

2. The reinforcement unit of claim 1, wherein:
   the first connecting member is formed of a "V" character shape.

3. The reinforcement unit of claim 1, wherein:
   the center of the first connecting member is inserted to the first mounting bracket through a predetermined part and is combined with the first mounting bracket through an adhesive and a riveting.

4. The reinforcement unit of claim 1, wherein:
   both ends of the first connecting member are respectively bolted to the first connection bracket and the second connection bracket.

5. The reinforcement unit of claim 1, wherein the second connecting member includes:
   a center portion disposed to be horizontal to the cowl and mounted to the second mounting bracket;
   a first bending portion formed from one end of the center portion toward the first connection bracket; and
   a second bending portion formed from another end of the center portion toward the second connection bracket.

6. The reinforcement unit of claim 5, wherein:
   the center portion is inserted to the second mounting bracket, an upper exterior circumference is adhered to an upper inside of the second mounting bracket through an adhesive, and a lower exterior circumference is not applied with the adhesive.

7. The reinforcement unit of claim 5, wherein:
   the center portion is fixed to the second mounting bracket through at least one pipe nut penetrating the second mounting bracket to be inserted inside the second mounting bracket.

8. The reinforcement unit of claim 5, wherein:
   the first bending portion and the second bending portion are formed to be inclined from the rear of the vehicle body toward the front of the vehicle body.

9. The reinforcement unit of claim 5, wherein:
   in the first connection bracket, a first socket inserted with the other end of the first bending portion having one end that is integrally connected to the center portion is formed.

10. The reinforcement unit of claim 9, wherein:
    another end of the first bending portion in a state that it is inserted to the first socket is fixed to the first socket through the adhesive and the rivet.

11. The reinforcement unit of claim 5, wherein:
    in the second connection bracket, a second socket is formed to be inserted with another end of the second bending portion having one end integrally connected to the center portion is formed.

12. The reinforcement unit of claim 11, wherein:
    the another end of the second bending portion in a state that it is inserted to the second socket is fixed to the second socket through the adhesive and the riveting.

13. The reinforcement unit of claim 1, wherein:
    the first connecting member and the second connecting member connected through the first connection bracket and the second connection bracket are formed of a rhombus shape.

14. The reinforcement unit of claim 1, wherein:
    the first connecting member and the second connecting member are formed of a carbon fiber-reinforced plastic (CFRP).

* * * * *